United States Patent [19]
Houlberg et al.

[11] Patent Number: 5,887,198
[45] Date of Patent: Mar. 23, 1999

[54] PROGRAMMABLE STAND-ALONE DRIVE APPARATUS FOR INTERFACING A HOST COMPUTER WITH PCMCIA MEMORY CARDS HAVING MULTIPLE FORMATS

[75] Inventors: Christian L. Houlberg, Ventura; Gary S. Borgen; Richard J. Busse, both of Camarillo, all of Calif.

[73] Assignee: The United States of America as represented by the Secretary of the Navy, Washington, D.C.

[21] Appl. No.: 838,476

[22] Filed: Apr. 7, 1997

[51] Int. Cl.⁶ .................................................. G06F 13/00
[52] U.S. Cl. ........................................... 395/882; 395/280
[58] Field of Search ....................................... 395/280, 281, 395/285, 306, 308, 309, 681, 822, 828, 882, 883, 884, 892, 894, 200.8

[56] References Cited

U.S. PATENT DOCUMENTS

| | | | |
|---|---|---|---|
| 5,282,247 | 1/1994 | McLean et al. | 380/4 |
| 5,473,765 | 12/1995 | Gibbons et al. | 395/500 |
| 5,499,346 | 3/1996 | Amini et al. | 395/308 |
| 5,500,517 | 3/1996 | Cagliostro | 235/486 |
| 5,519,851 | 5/1996 | Bender et al. | 395/500 |
| 5,537,343 | 7/1996 | Kikinis et al. | 364/708.1 |
| 5,537,558 | 7/1996 | Fletcher et al. | 395/309 |
| 5,600,800 | 2/1997 | Kikinis et al. | 395/281 |
| 5,606,529 | 2/1997 | Honma et al. | 365/230.03 |
| 5,608,606 | 3/1997 | Blaney | 361/686 |
| 5,613,092 | 3/1997 | Lim et al. | 395/500 |
| 5,615,344 | 3/1997 | Corder | 395/309 |
| 5,633,799 | 5/1997 | Dussell | 701/215 |
| 5,706,239 | 1/1998 | Brys | 365/226 |
| 5,727,184 | 3/1998 | Richter et al. | 395/500 |
| 5,793,989 | 8/1998 | Moss et al. | 395/285 |

*Primary Examiner*—Krisna Lim
*Assistant Examiner*—Viet Vu
*Attorney, Agent, or Firm*—David S. Kalmbaugh

[57] ABSTRACT

A memory card drive which is compatible with MS-DOS computer systems as well as other computers which do not use MS-DOS as the operating system. The memory card drive comprises an embedded server which is a bridge between a client computer and a pair of memory cards allowing for communication and data transfer between the client computer and the memory cards. The server includes an ethernet interface which connects the server to ethernet bus which is connected to the client computer. The server has a memory card interface module which allows the client computer to communicate with the memory cards and thereby transfer data to the memory cards and retrieve data from the memory cards. The server also includes an embedded computer which enables and controls the functions and operation of the memory card interface and ethernet interface using a computer software program. The embedded computer has a two megabyte hard drive which has the computer software program stored therein.

10 Claims, 4 Drawing Sheets

PROGRAMMABLE STAND-ALONE DRIVE APPARATUS FOR INTERFACING A HOST COMPUTER WITH PCMCIA MEMORY CARDS HAVING MULTIPLE FORMATS

BACKGROUND OF THE INVENTION

1. Field of the Invention

The present invention relates generally to IBM compatible personal computer systems. More specifically, the present invention relates to a digital computer system having an IBM compatible personal computer for providing a bridge between a host computer and PCMCIA memory cards which allows for data transfer between the host computer and the memory cards.

2. Description of the Prior Art

The Personal Memory Card International Association (PCMCIA) memory card is a widely accepted storage medium for use with personal computers. The memory card's small size, large storage capacity and ruggedness have made the memory card the ideal storage device for storage of data in military and civilian systems.

The personal computer memory card was originally developed for use with palm top and lab top MS-DOS compatible computers. During the course of development of the personal computer memory card, several different types of memory cards which use varying technologies and architectures have evolved.

The personal computer memory card is made from two primary technologies: (1) the Static Random Access Memory (SRAM) and (2) the Flash Electronically Erasable Programmable Read Only Memory (EEPROM). Static Random Access Memory Cards have a memory mapped architecture, while Flash Electronically Erasable Programmable Read Only Memory Cards have memory mapped series I and II and Advanced Technology Attachment (ATA) architectures.

A computer system or drive transferring data to a memory mapped PC memory card needs specific card parameters such as timing parameters for the card, block size and card memory size for a successful data transfer.

Series I memory cards do not have built in attribute sections containing the required card parameters. These card parameters must be transferred to the memory card along with the data for later extraction by a computer system having custom software.

Series II PC memory cards include an attribute section which has a standardized Card Information Structure (CIS) describing the memory card's device parameters. In addition, Series II PC memory cards have an on board controller to control write and erase timing functions which eliminates these functions from the computer system transferring the data.

Unlike ATA PC memory cards, memory mapped PC memory cards do not have a file system. These memory mapped PC cards may include memory mapped data dumps, programs that are executed in place, files which use a commercial flash file system or files which use a custom flash file system. In addition, Microsoft's FFS2 flash file system and M-System's TrueFFS flash file system, which are the two largest commercially available flash file systems, are not compatible.

Presently, a number PC Memory Card drives are not capable of interfacing with all PC memory cards. In particular, computers which are not compatible with IBM personal computers (MS-DOS compatible) can only interface with a limited number of PC memory cards. Further, a number of PC I/O Cards include device drives required by the memory card for operation which can only be run from an IBM compatible personal computer.

For example, there are commercially available from Adtron Corporation of Chandler, Arizona PC Card drives which interface to a host computer via the Small Computer Systems interface (SCSI). These PC Card drives allow the host computer to read, write to, format and erase ATA Flash Disk cards. However, these PC Card drives do not allow for (1)erasing, writing or formatting of PCMCIA Flash Memory cards; and (2) communication with some PC I/O cards. These PC Card drives are also limited to reading from and writing to pre-formatted Static Random Access Memory cards. Accordingly, there is a need for a PC card drive which is compatible with MS-DOS computer systems as well as other computers which do not use MS-DOS as the operating system. In addition, the PC card drive should support all utilities including writing to the memory card, formatting the memory card, reading the memory card and erasing the memory card.

SUMMARY OF THE INVENTION

The personal computer memory card drive of the present invention overcomes some of the disadvantages of the prior art including those mentioned above in that it comprises a relatively simple, yet highly effective memory card drive which is compatible with MS-DOS computer systems as well as other computers which do not use MS-DOS as the operating system. The personal computer memory card drive comprises an embedded PC FTP server which is a bridge between an FTP client computer and a pair of PCMCIA memory cards allowing for communication and data transfer between the client computer and the memory cards.

The server includes an ethernet interface which connects the server to the ethernet bus which is connected to the client computer. The server has a PCMCIA interface module which allows the FTP client computer to communicate with the PCMCIA memory card and thereby transfer data to the memory cards and retrieve data from the memory cards.

The server also includes PC DOS Computer which enables and controls the functions and operation of the PCMCIA interface and ethernet interface using a computer software program. The PC DOS Computer has a two megabyte hard drive which has the computer software program stored therein.

The personal computer memory card drive is adapted for use with ATA PC memory cards, static RAM memory cards and Flash EEPROM memory cards. Standard MS-DOS commands such as format, copy, dir and delete are supported and may be used with the personal computer memory card drive. In addition, the personal computer memory card drive supports Databook's ThinCard utilities which include tcformat, tcinit, tcprog, tcxcopy, tcerase and tcread as well as M-Systems utilities which include tformat, cardtest, tcheck, unmount and tinfo.

DETAILED DESCRIPTION OF THE PREFERRED EMBODIMENTS

Figure 1:
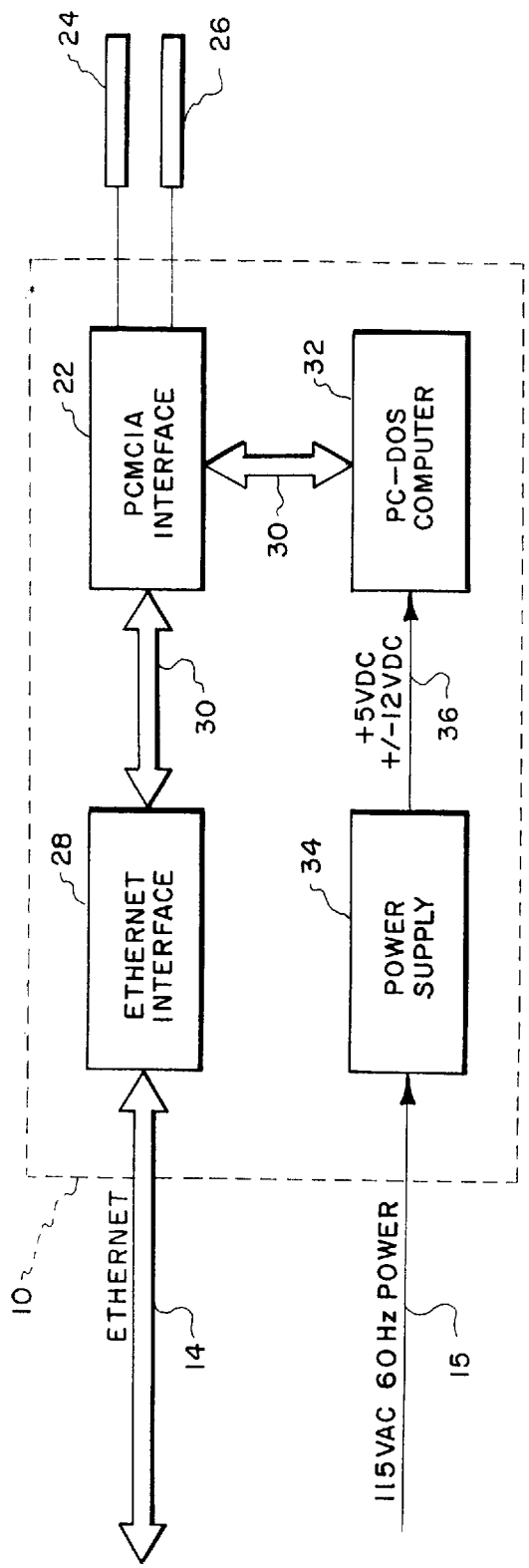
FIG. 1 is an electrical system block diagram of a universal personal computer card drive system constituting one embodiment of the present invention.
Figure 2:
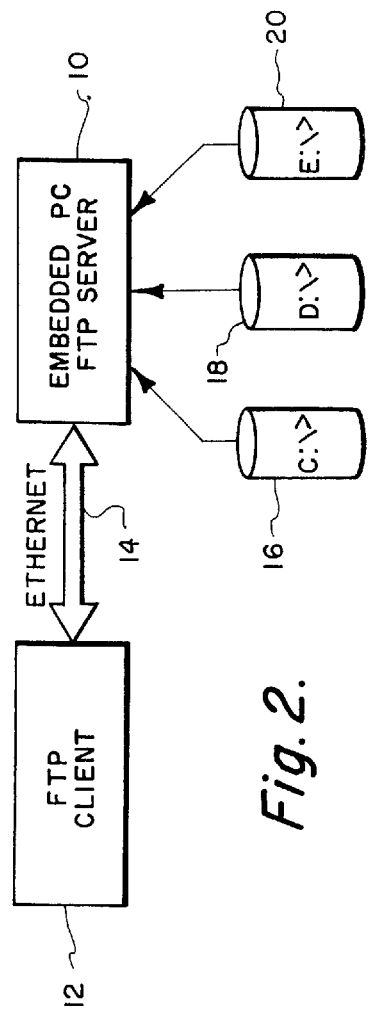
FIG. 2 illustrates the drive system of FIG. 1 functioning as a bridge between a host computer and PCMCIA memory cards.

Referring first to FIGS. 1 and 2, there is shown an embedded PC (personal computer) FTP (file transfer protocol) server 10 which is a bridge between an FTP client/host computer 12 and a pair of PCMCIA (Personal Computer Memory Card International Association) memory cards 24 and 26. Server 10 allows for data transfer from computer to memory cards 24 and 26 and storage of the transferred data in memory cards 24 and 26. The FTP client computer 12 may be any digital computer system which is DOS or Windows compatible. Client computer 12 may also be an Apple MAC personal computer, a Hewlett Packard computer system, a SUN computer and other computer systems which are not DOS compatible. An ethernet bus 14 connects FTP client computer 12 to FTP server 10 allowing for communication between FTP client computer 12 and FTP server 10.

As shown in FIG. 1, FTP server 10 includes a power supply 34 which receives 115 VAC, 60 Hz power via a power line 15 from a source of power (not illustrated) which may be a wall outlet. Power supply 34 is connected to PC-DOS computer 32 by a power line 36 to supply to computer 32 +5 VDC and ±12 VDC. Computer 32 has a two megabyte hard drive 16 which is designated as drive C. The computer software program of Appendix A is stored in Drive C in the root directory (C:\>) and in several sub-directories (e.g. C:\NET\BIN\>) to reduce confusion and simplify software management.

Computer 32 is connected to a PCMCIA interface module 22 by a communications bus 30 which also connects PCMCIA interface 22 to an ethernet interface module 28. Ethernet interface 28 is connected to the client computer 12 by ethernet bus 14. Communications bus 30 is a PC/104 expansion bus, which is the PC/104 Consortium standard for PC-compatible modules.

Ethernet interface 28 includes an Ethernet local area network (LAN) controller to interconnect ethernet bus 14 and PCMCIA interface 22. The Ethernet LAN controller uses Carrier Sense, Multiple Access/Collision Detect (CSMA/CD) for node access and operates at a 10 Mbits/second data rate. Interface 28 includes logic circuits to send and receive data packets and for CSMA/CD network access. The ethernet interface used in the present invention is a Model MiniModule™/Ethernet-II system commercially available from Ampro Computers Incorporated of Sunnyvale, Calif.

There is also a D drive 18 and an E drive 20 which are adapted to receive PCMCIA memory cards 24 and 26 connecting memory cards 24 and 26 to PCMCIA interface module 22.

PC-DOS computer 32 is the processor for PCMCIA interface 22 and ethernet interface 28 communicating with interface 22 and interface 28 via bus 30. Computer 32 enables and also controls the functions and operation of PCMCIA interface 22 and ethernet interface 28 using the computer software program listed in Appendix A. PC-DOS computer 32 is a 50 Megahertz 486SLC PC/AT compatible computer, Model CoreModule™/486-II, which has the MS-DOS 6.2 operating system and which is commercially available from AMPRO Computers Incorporated of Sunnyvale, Calif. Computer 32 is also provided with a keyboard interface allowing a user of computer 32 to access computer 32 via a keyboard (not shown). In addition, computer 32 has a pair of RS232C serial ports and a bidirectional parallel port allowing for video monitors, printers, disk drives, modems and other computer equipment to be connected to computer 32.

PCMCIA interface 22 is an interface module which allows the FTP client computer 12 to communicate with PCMCIA memory card 24 and 26 and thereby transfer data to memory cards 24 and 26 and retrieve data from memory cards 24 and 26. Memory Cards may be Static Random Access Memory (SRAM) cards, Flash Electrically Erasable Programmable Read Only Memory (EEPROM) cards, and/or ATA Flash Disk or Hard Disk Memory Cards. A user of FTP client computer 12 by entering the desired command into computer 12 may, for example, format memory cards 24 and 26, copy data or files from an external source to memory cards 24 and 26 (write utility), read the contents of memory cards 24 and 26 and save the contents in a disk file, and erase memory cards 24 and 26. PCMCIA interface 22 is a commercially available module, Model MiniModule™/PCMCIA, from Ampro Computers Incorporated of Sunnyvale, Calif. PCMCIA interface 22 has two sockets, Socket 1 and Socket 2 which are designed to accept a wide range of PCMCIA cards. The computer software program used by computer 32 recognizes Socket 1 and Socket 2 as drive D (reference numeral 18, FIG. 2) and drive E (reference numeral 20, FIG. 2).

The following table illustrates a number of the utilities which computer 12 may use to prepare PC memory cards 24 and 26 for operation with standard DOS commands such as format, copy, and delete.

There is also illustrated in the following table a set of six Thincard (TC) utilities/programs which are beyond the capabilities of the standard DOS commands. Memory cards based on battery backed static RAMs appear as read/write disk drives to programs. This is accomplished by a set of software drivers and utilities which are Databook CardTalk™ drivers and ThinCard™ utilities. ThinCard™ (TC) utilities and the CardTalk™ software package are commercially available from Databook Incorporated of Ithaca, N.Y.

Memory cards based on Flash EPROM technology are handled (1) as write once/read many cards using ThinCard utilities, or (2) as full read/write using drives M-System's True Flash File System. The ThinCard utilities can write an image equivalent to a static RAM image which is identified as a File Allocation Table file system. The TrueFFS drivers and utilities make Flash memory cards appear as disk drives with full read/write capability. Standard DOS utilities such as COPY, DIR, CHKDSK operate in a normal manner. The following table illustrates utilities for M-System's of Melville, N.Y. True Flash File System software programs.

TABLE I

| FUNCTION | SRAM UTILITY | FLASH UTILITY | ATA UTILITY |
| --- | --- | --- | --- |
| PC Card format[1] | tcformat | | format |
| PC Card format[2] | | tcerase tcformat-type flash | |
| Place CIS on PC card | tcint | tcint | |
| Copy Files | copy | | copy |
| Format, initialize and copy files to PC Card[3] | | tcxcopy | FFS2 format |
| Copy file from card | | copy | |
| Program PC Card[4] | tcprog | tcprog | |
| Copy PC Card to a file[4] | tcread | tcread | |
| Delete file | | | delete |
| Erase PC Card | tcerase | tcerase | |
| Test Flash chips | | cardtest | |
| TrueFFS format | | tformat | |
| Check TrueFFS format | | tcheck | |
| Remove TrueFFS control | | unmount | |
| System information | tinfo | tinfo | tinfo |

Notes:
[1]·DOS FAT
[2]·Erase and FFS2 format
[3]·FFS2 format
[4]·Binary Image

The TCFORMAT utility of Table I is a command which formats SRAM and Flash memory cards. When formatting an SRAM memory card the TCFORMAT utility places a DOS File Allocation Table on the card in exactly the same manner as the DOS FORMAT command does when formatting a floppy diskette. When the TCFORMAT utility is used with a Flash memory card, TCFORMAT places Microsoft's Flash File System version 2.0 on the card.

The TCERASE utility of Table I is a command which erases a Flash memory card's common memory. TCERASE does not erase a Flash memory card's attribute memory. This requires the creation of a new Card Information Structure (CIS) using the TCINIT utility.

The TCINIT utility of Table I is a command for placing a Card Information Structure on a memory card. If a memory card has attribute memory, TCINIT stores as much of the CIS data as will fit in attribute memory into attribute memory. When the memory card does not have attribute memory TCINIT stores the CIS information in the first sector of the memory card. TCINIT erases all existing CIS information on the card prior to placing a new CIS on the memory card.

The TCREAD utility of Table I is a command that is used to read the contents of a memory card and save the contents in a binary file. The TCREAD utility provides an exact byte by byte image of the entire card.

The TCXCOPY utility of Table I is a command which creates a DOS compatible read only File Allocation Table file system on a Flash memory card and copies files to the card. The TCXCOPY utility's function and syntax are similar to those of the DOS XCOPY command.

The TCPROG utility of Table I is a command used to program a binary image stored in a file to SRAM memory card or a Flash memory card.

The CARDTEST utility of Table I performs diagnostics on Flash memory card hardware. The CARDTEST utility may be used to perform the following diagnostic functions: (1) identify the Flash chip technology and the Flash medium geometry; (2) verify the address and data lines of the Flash controller and of each flash chip and (3) test for the correct functioning of each Flash byte in the medium. It should be noted that the first function may be performed non-destructively, while the remaining functions may be performed only by destroying user data and the TrueFFS format on the medium.

The TCHECK utility of Table I verifies the underlying TrueFFS format and may be used to correct formatting inconsistencies. The TCHECK utility is comparable to DOS CHKDSK program or the Norton Disk Doctor. The TCHECK utility performs the following consistency scans of the TrueFFS format: (1) check that the spare transfer units are erasable with an error indicating that the system's power supply to the Flash medium is insufficient, or that the Flash unit is faulty; (2) logical to virtual scan of the format tables and (3) virtual-to-logical scan of the format tables.

The TFORMAT utility of Table I is used to format a FLASH PCMCIA memory card under M-Systems True Flash File System. A memory card may be formatted more than once, however formatting will erase data already stored on the card.

The TINFO utility of Table I provides information about installed software and inserted media. In particular, the TINFO utility (1) reports TrueFFS drive letters; (2) reports installed PCMCIA software and its version compliance; (3) reports the presence of media and selected CIS information and (4) reports the size of inserted media.

The UNMOUNT utility of Table I may be used when TrueFFS is installed in a drive sharing manner with the /Drive=switch. The effect of the UNMOUNT command is to temporarily return the drive letter to the control of its original driver. The UNMOUNT utility is in effect until the media is reinserted or the system is rebooted.

Referring to FIGS. 1 and 2 and the computer software listing of Appendix A the root directory (C:\>) has the configuration software for server 10 including a directory for Microsoft's software, a directory for Novell's Ethernet communications software and a directory for PC memory card software. The root directory also has the MS-DOS command processor (COMMAND.COM), the system configuration (CONFIG.SYS) and the system startup batch program (AUTOEXEC.BAT).

LANWP.BAT is a startup batch program for Ethernet interface 28, which is located in the root directory. LANWP.BAT invokes software in the NET sub-directory which configures server 10 allowing server 10 to communicate via ethernet bus 14. PROTOCOL.INI and SMC9000.COM are software programs commercially available from Novell of San Jose, Calif. which are required to communicate with computer 12 via the interface bus 14. PROTOCOL.INI is a file initialization for the protocol stack and SMC9000.COM is the workstation driver.

The DOS sub-directory includes SETVER.EXE which sets the version of DOS to be used by computer 32 and server 10, and ANSI.SYS which allows computer 32 and server 10 to recognize the ANSI character set which includes ASCII characters and graphics characters. The DOS sub-directory also includes FORMAT.COM which allows ATA memory cards to be formatted.

The NET sub-directory provides the software for setting up or enabling communications over ethernet bus 14. The BIN sub-directory in C:\NET\>includes FTP software and overlays used with the software. TCPIP.EXE is an internet protocol software used to communicate over the ethernet bus 14. The XPC programs are messages used to transfer data to and from PC computer 32.

The HSTACC sub-directory includes fonts, codes and maps which facilitate the transfer of data over the ethernet bus 14. The TCP sub-directory includes files which have information to identify nodes or devices on the ethernet bus 14. For example, TCP sub-directory includes files which would identify client computer 12 as being on the ethernet bus 14. In the example of Appendix A, a pair of personal computers (addresses 143.113.217.21 and 143.113.217.4) and embedded PC FTP server 10 (address 143.113.217.24) are identified as being on ethernet bus 14.

The PCMCIA sub-directory includes the files for communicating with PC memory cards 24 and 26 via PCMCIA interface 22. PCMCIA interface 22 has two sockets for connecting memory cards 24 and 26 to interface 22. AMPSS.SYS provides the PCMCIA socket services software interface or driver for the sockets of interface 22. CTALKCS.EXE is the PC card services driver which provides an interface to the "Client Manager" which is CARDTALK.SYS. CARDTALK.SYS is the driver which handles the registration and access for all client drivers in the system. The driver automatically scans memory and peripheral cards and assigns them DOS resources as required. For example, if a modem card is installed, CARDTALK.SYS automatically assigns it a COM port and interrupt. CARDDOC.TXT is a text file with information about PCMCIA memory cards that are supported by CardTalk software. CARDINFO.DBK is a database file containing technical descriptions of supported memory cards which is used by the card formatter TCFORMAT.COM.

TC.CFG is an auxiliary program used by the six ThinCard utilities set forth in Table I and the program listing of Appendix A. The ThinCard utilities are TCERASE.EXE, TCFORMAT.EXE, TCINIT.EXE, TCPROG.EXE, TCREAD.EXE and TCXCOPY.EXE. These utilities erase, format, install Card Information Structure, program and read PC memory cards as well as copy DOS files to Flash memory cards.

TFFSCS.COM is the TrueFFS device driver that works with AMPSS.SYS and CardTalk drivers. RESETDB.SYS is a utility used during system boot up. The remaining utilities in the PCMCIA sub-directory are TrueFFS programs which are used to perform formatting and related functions of Table I for Flash EEPROM memory cards.

The program listing for the CONFIG.SYS software which is the system configuration is set forth in Appendix A. The program listing for AUTOEXEC.BAT which is the startup batch program is also set forth in Appendix A as well as the program listing for LANWP.BAT which is the startup Ethernet batch program.

Figure 3:
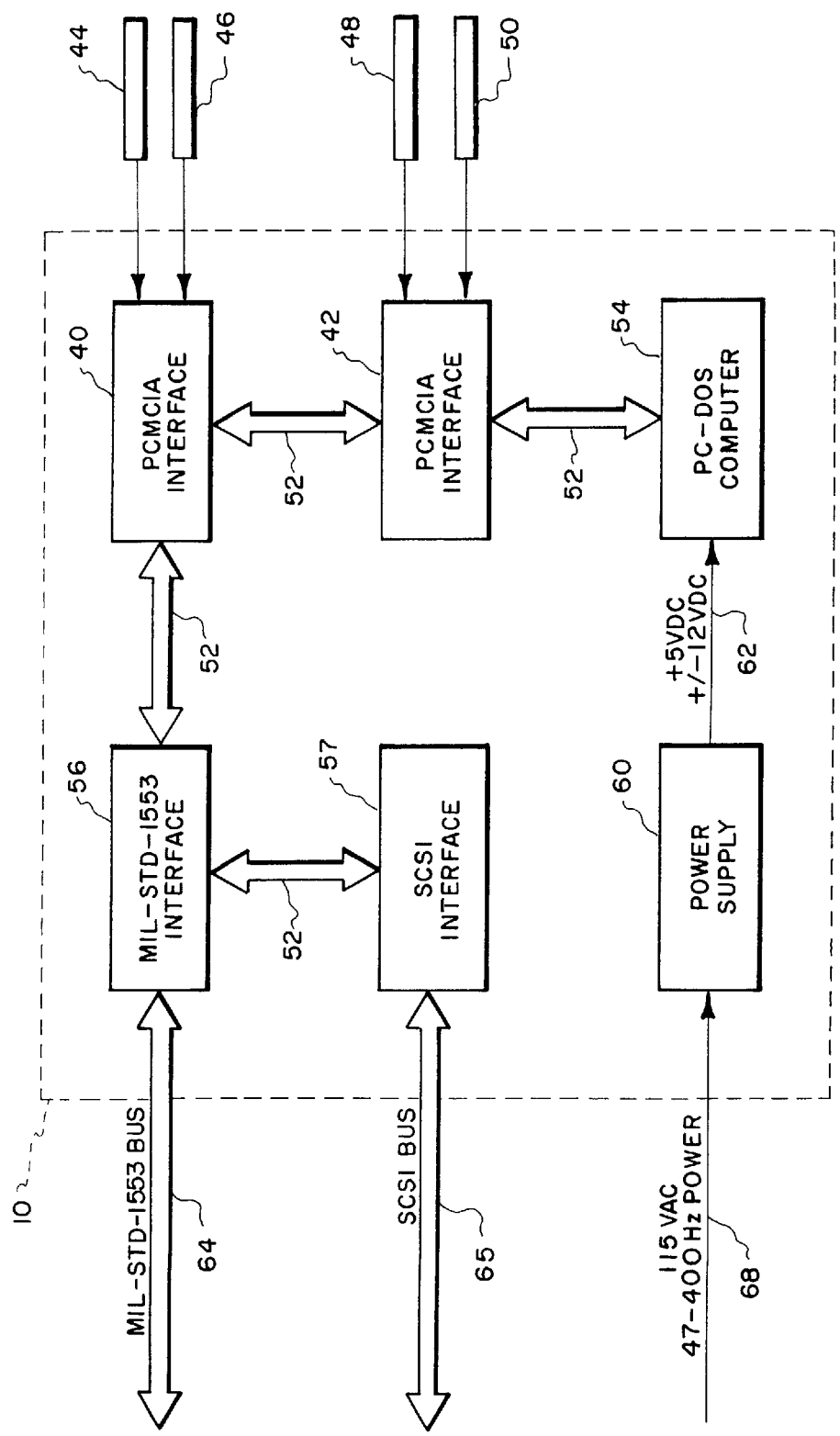
FIG. 3 is an electrical system block diagram of the universal personal computer card drive system which constitutes a second embodiment of the present invention and which is integrated with the MIL-STD-1553 bus.

FIG. 3 illustrates a second embodiment of embedded PC FTP server 10 which has a pair of interfaces 40 and 42, with interface 40 being connected to a first pair of PCMCIA memory cards 44 and 46 and interface 42 being connected to memory cards 48 and 50. Server 10 of FIG. 3 is adapted to communicate with the military aircraft MS-1553 multiplex data bus 64 through an MS-1553 interface module 56. Military Standard 1553 contains requirements for aircraft internal command/response time division multiplexing data bus techniques utilized in systems integration of aircraft subsystems. This military standard applies to a variety of avionics applications including, for example, the F-15 and F-18 military aircraft. MIL-STD-1553 Bus 64 is a dual redundant bus used to communicate with and transfer data to and from the avionics and electronic warfare systems on board military aircraft.

Server 10 is also adapted to communicate with the Small Computer Systems Interface (SCSI) bus 65 via a SCSI interface 57. Data transfer between the modules of server 10 is via communications bus 52. Communications bus 52 connects computer 54 to PCMCIA interfaces 40 and 42 and also connects PCMCIA interface 40 to MS-1553 interface module 56 and SCSI interface 57. Computer 54 enables and also controls the functions and operation of PCMCIA interfaces 40 and 42 and MS-1553 interface module 56 as well as the functions and operation of SCSI interface 57 using a computer software program similar to the program of Appendix A. Communications bus 52 is a PC/104 expansion bus. PCMCIA interface modules 40, 42 are AMPRO MiniModule/PCMCIA and computer 54 is an Ampro CoreModule/486-II CPU.

Figure 4:
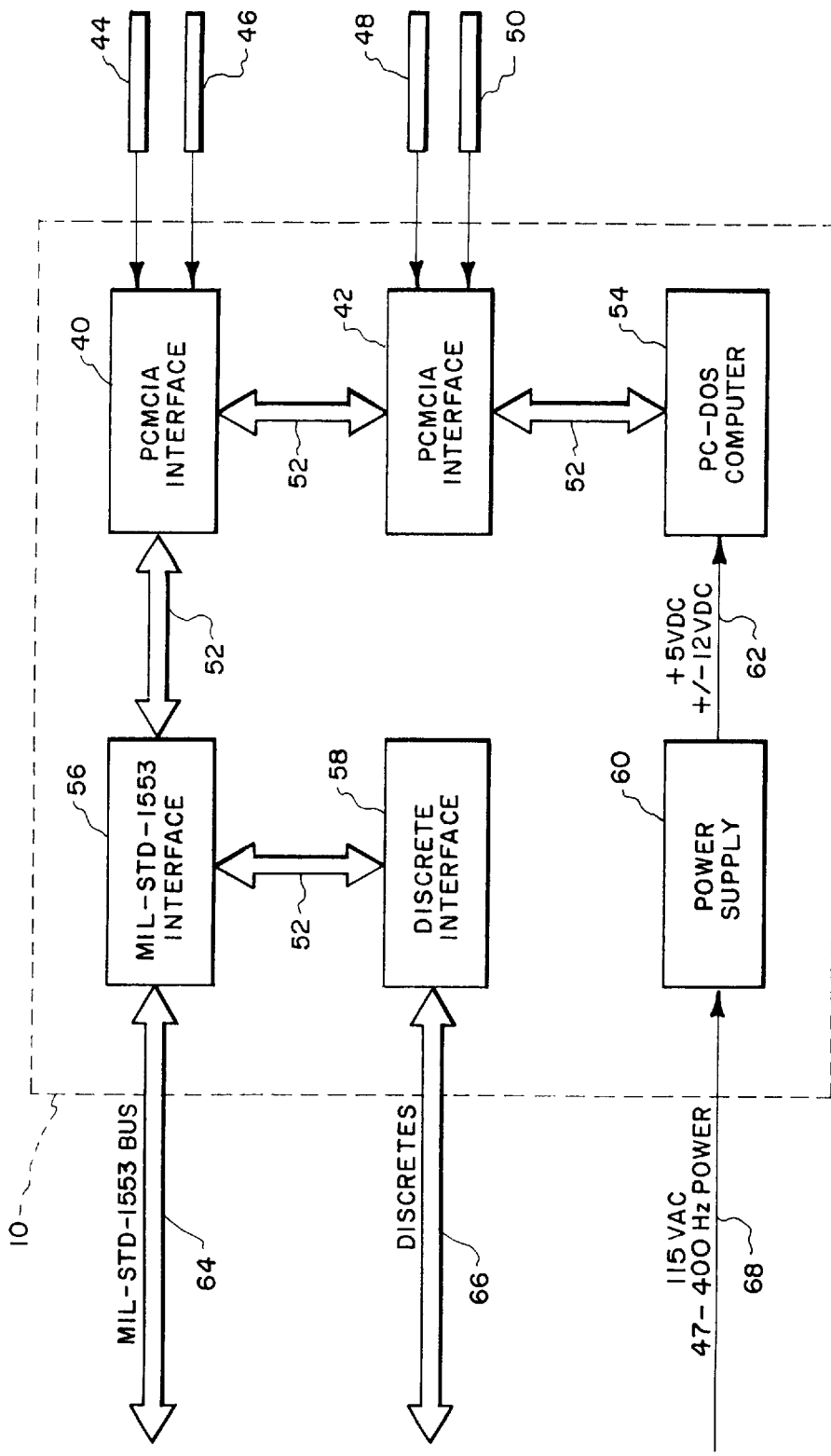
FIG. 4 is an electrical system block diagram of the universal personal computer card drive system which constitutes a third embodiment of the present invention and which is also integrated with the MIL-STD-1553 bus.

The server 10 illustrated in FIG. 4 is identical to the server of FIG. 3, except that server 10 of FIG. 4 communicates with a discrete bus 66 via a discrete interface 58.

Figure 5:
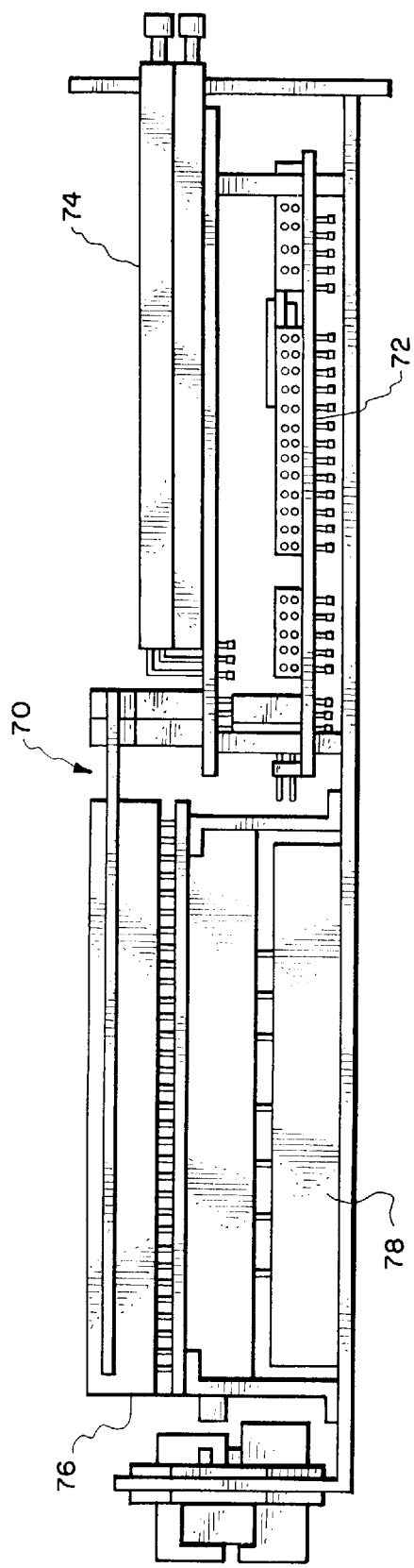
FIG. 5 is schematic diagram of the PC card component layout for the universal personal computer card drive system of the present invention.

Referring to FIGS. 1 and 5, FIG. 5 illustrates the PC card component layout for the universal personal computer card drive system of FIG. 1. Mounted on a chassis or enclosure, designated generally by the reference numeral 70, are the electrical components of server 10 which include computer 72, PCMCIA interface module 74, power supply 78 and ethernet interface module 76.

From the foregoing it may readily be seen that the present invention comprises a new, unique and exceedingly useful personal computer memory card drive which is a considerable improvement over the known prior art. Obviously many modifications and variations of the invention are possible in light of the above teachings. It is, therefore, to be understood that within the scope of the appended claims the invention may be practiced otherwise than as specifically described.

APPENDIX A

| Software Listing | Description |
| --- | --- |
| C:\> | Root directory (boot or configuration software) |
|   DOS <DIR> | Directory for Microsoft software |
|   NET <DIR> | Directory for Novell Ethernet software |
|   PCMCIA <DIR> | Directory for PC Card software |
|   COMMAND.COM[1] | Microsoft's MS-DOS command processor |
|   CONFIG. SYS | Invention's system configuration |
|   AUTOEXEC.BAT | Invention's startup batch program |
|   LANWP.BAT | Invention's startup Ethernet batch program |
|   PROTOCOL. INI[2] | Novell's initialization file for the protocol stack |
|   SMC9000.COM[2] | Novell's Netware OKI workstation driver |
| C:\DOS\> | Microsoft's Disk Operating System software |
|   EMM3 86.EXE | |
|   HIMEM.SYS | |
|   SETVER.EXE | |
|   ANSI.SYS | |
|   FORMAT.COM | |
| C:\NET\> | Novell's Ethernet communications software |
|   BIN <DIR> | |
|   HSTACC <DIR> | |
|   TCP <DIR> | |
|   IPXODI.COM | |
|   LSL.COM | |
|   NETX.COM | |
|   NETX.CFG | |
| C:\NET\BIN\> | |
|   FTPSERV.BAT | |
|   FTPD.MSG | |
|   FTPD.EXE | |
|   TCPIP.EXE | |
|   LWP.MSG | |
|   XPC.OV2 | |
|   XPC.OV1 | |

APPENDIX A-continued

| | |
|---|---|
| XPC.OV0 | |
| XPC.MSG | |
| XPC.EXE | |
| XPC_PASS.TXT | |
| C:\NET\HSTACC\> | |
| FONTS.TXT | |
| SCANCODE.TXT | |
| SCANCODE.MAP | |
| PROMPTS.TXT | |
| 437-MLT.MAP | |
| 437-ISO.MAP | |
| 437-FIX.MAP | |
| C:\NET\TCP\> | |
| SERVICES | |
| PROTOCOL | |
| NETWORKS | |
| HOSTS | Invention's custom IP address alias list |
| C:\PCMCIA\> | PCMCIA (PC Card) software |
| AMPSS.SYS[3] | Ampro socket services driver |
| CTALKCS.EXE[4] | Databook's CardTalk PC Card services driver |
| CARDDOC.TXT[4] | Database file describing supported memory cards |
| CARDTALK.SYS[4] | Device driver for TCIC-2/N PC Card Controller |
| TC.CFG[4] | Auxiliary program used by TC utilities |
| TCERASE.EXE[4] | Utility for erasing memory cards |
| TCFORMAT.EXE[4] | Utility for formatting memory cards |
| TCINIT.EXE[4] | Utility for installing Card Information Structures |
| TCPROG.EXE[4] | Utility for programming memory cards |
| TCREAD.EXE[4] | Utility for reading memory cards |
| TCXCOPY.EXE[4] | Utility for copying DOS files to Flash memory cards |
| CARDINFO.DBK[4] | PC Card configuration file |
| TFFSCS.COM[5] | M-system's TrueFFS |
| RESETDB. SYS[5] | Utility used during system boot up |
| TFORMAT.COM[5] | Utility for formatting flash PC Cards |
| TCHECK.COM[5] | Utility to diagnose and verify TrueFFS format |
| CARDTEST.COM[5] | Utility to identify and test Flash chips on PC Card |
| TINFO.COM[5] | Utility to provide information on installed software, hardware, and media |

Invention's Custom Software:

| | |
|---|---|
| CONFIG.SYS | Invention's system configuration |
| DEVICE=C:\DOS\HIMEN.SYS | |
| DOS=HIGH,UMB | |
| DEVICE=C:\DOS\EMM386.EXE | |
| rem **** Baseline CardTalk Drivers required for PCMCIA PC Cards **** | |
| DEVICEHIGH=C:\PCMCIA\AMPSS.SYS/I0:240 | |
| DEVICEHIGH=C:\PCMCIA\CTALKCS.EXE | |
| DEVICEHIGH=C:\PCMCIA\CARDTALK.SYS/A/MEM=E000–E7FF | |
| rem **** End of required Baseline CardTalk Drivers **** | |
| rem **** True Flash File System (TrueFFS) Drivers **** | |
| DEVICEHIGH=C:\PCMCIA\TFFSCS.COM DEVICEHIGH= | |
| C:\PCMCIA\RESETDB.SYS | |
| rem **** End of TrueFFS Drivers **** | |
| DEVICE=C:\DOS\ANSI.SYS | |
| DEVICE=C:\DOS\SETVER.EXE | |
| BUFFERS=40 | |
| FILES=40 | |
| LASTDRIVE=E | |
| AUTOEXEC.BAT | Invention's startup batch program |
| @ECHO OFF | |
| PROMPT $p$g | |
| PATH C:\;C:\DOS;C:\PCMCIA | |
| CALL LANWP.BAT | |
| LANWP.BAT | Invention's startup Ethernet batch program |
| path %path%;c:\net;c:\net\bin | |
| lsl.com | |
| smc9000.com | |
| ipxodi.com | |
| tcpip.exe | |
| break on | |
| rem ftpserv | |
| xpc < c:\net\bin\xpc_pass.txt | |
| HOSTS | Invention's custom IP address alias list |

APPENDIX A-continued

| | |
|---|---|
| 143.113.217.21 | borgen PC |
| 143.113.217.4 | borgen PC |
| 143.113.217.24 | upcd |

[1] Microsoft's Disk Operating System (MS-DOS) software.
[2] Novell's Ethernet communications software.
[3] AMPRO provided software.
[4] Databook's CardTalk software.
[5] M-System's TrueFFS software.

What is claimed is:

1. A personal computer memory card drive for transferring data and commands between a host computer and a pair of memory cards, said host computer being connected to an ethernet bus, said personal computer memory card drive comprising:

an enclosure;

a personal computer mounted within said enclosure for performing digital operations, said personal computer comprising a DOS operating system computer;

a power supply connected to said personal computer, said power supply being mounted within said enclosure;

an ethernet interface mounted within said enclosure, said ethernet interface being connected to said ethernet bus;

a memory card interface having a D drive and an E drive, said memory card interface being mounted within said enclosure;

a communications bus connecting said memory card interface to said personal computer, said communications bus connecting said memory card interface to said ethernet interface;

the D and E drives of said memory card interface receiving and connecting said pair of memory cards to said personal computer memory card drive to establish digital communications between said host computer and said pair of memory cards over said personal computer memory card drive; and said personal computer having a software program stored in said personal computer, said software program enabling operation of said personal computer and said personal computer memory card drive to accommodate their use with different bus standards, data protocols, commands and formats of said host computer.

2. The personal computer memory card drive of claim 1 wherein said memory card interface comprises a Personal Memory Card International Association (PCMCIA) interface adapted to receive Personal Memory Card International Association (PCMCIA) memory cards including Static Random Access Memories and Flash Electronically Erasable Programmable Read Only Memories.

3. The personal computer memory card drive of claim 1 wherein said communications bus comprises a PC/104 expansion bus.

4. The personal computer memory card drive of claim 1 wherein the D and said E drives of said memory card interface each comprise a socket adapted to accept one of said pair of memory cards.

5. A personal computer memory card drive for transferring data and commands between a military standard 1553 multiplex data bus and first, second, third and fourth memory cards, said personal computer memory card drive comprising:

an enclosure;

a personal computer mounted within said enclosure for performing digital operations, said personal computer comprising a DOS operating system computer;

a power supply connected to said personal computer, said power supply being mounted within said enclosure;

a military standard 1553 interface mounted within said enclosure, said military standard 1553 interface being connected to said military standard 1553 multiplex data bus;

a first memory card interface having a D drive and an E drive, said first memory card interface being mounted within said enclosure;

a second memory card interface having a D drive and an E drive, said second memory card interface being mounted within said enclosure;

a communications bus connecting said first and second memory card interfaces to said personal computer, said communications bus connecting said first and second memory card interfaces to said military standard 1553 interface;

the D and E drives of said first memory card interface receiving and connecting said first and second memory cards to said personal computer memory card drive;

the D and E drives of said second memory card interface receiving and connecting said third and fourth memory cards to said personal computer memory card drive;

the D and E drives of said first and second memory card interfaces establishing digital communication between said military standard 1553 multiplex data bus and said first, second, third and fourth memory cards over said personal computer memory card drive; and said personal computer having a software program stored in said personal computer, said software program enabling operation of said personal computer and said personal computer memory card drive to accommodate their use with different bus standards, data protocols, commands and formats of said military standard 1553 multiplex data bus.

6. The personal computer memory card drive of claim 5 wherein said first and second memory card interfaces each comprise a Personal Memory Card International Association (PCMCIA) interface adapted to receive Personal Memory Card International Association (PCMCIA) memory cards including Static Random Access Memories and Flash Electronically Erasable Programmable Read Only Memories.

7. The personal computer memory card drive of claim 5 wherein said communications bus comprises a PC/104 expansion bus.

8. The personal computer memory card drive of claim 5 wherein the D and E drives of said first and second memory card interfaces each comprise a socket adapted to accept one of said first, second, third and fourth memory cards.

9. The personal computer memory card drive of claim 5 further comprising a Small Computer Systems Interface, said Small Computer Systems Interface being adapted to connect said personal computer memory card drive to a Small Computer Systems Interface bus to establish digital communications between said Small Computer Systems Interface bus and said first, second, third and fourth memory cards over said personal computer memory card drive, said Small Computer Systems Interface being connected to said communications bus of said personal computer memory card drive.

10. The personal computer memory card drive of claim 5 further comprising a Discrete Interface, said Discrete Interface being adapted to connect said personal computer memory card drive to a Discrete Interface bus to establish digital communications between said Discrete Interface Bus and first, second, third and fourth memory cards over said personal computer memory card drive, said Discrete Interface being connected to said communications bus of said personal computer memory card drive.

\* \* \* \* \*